United States Patent [19]

Nehma

[11] 4,123,180
[45] Oct. 31, 1978

[54] TUBE CONNECTOR

[76] Inventor: Roland E. Nehma, 80 Roger Pilon St.,, Dollard des Ormeaux, Montreal, Quebec, Canada

[21] Appl. No.: 695,155

[22] Filed: Jun. 11, 1976

[30] Foreign Application Priority Data

Aug. 12, 1975 [CA] Canada ................................. 233299

[51] Int. Cl.² ............................................. F16B 7/00
[52] U.S. Cl. .................................. 403/172; 403/292; 403/329
[58] Field of Search ............... 403/292, 295, 329, 402, 403/297, 298, 172, 171, 176, 155, 154; 29/509; 52/753 E; 285/304; 248/414, 188.5

[56] References Cited

U.S. PATENT DOCUMENTS

| 2,608,229 | 8/1952 | Brutus | 151/7 |
| 3,149,654 | 9/1964 | Podell | 151/7 X |
| 3,227,198 | 1/1966 | Coyle | 151/7 |
| 3,272,582 | 9/1966 | Anderson et al. | 403/172 X |
| 3,883,257 | 5/1975 | Delafield | 403/172 |

FOREIGN PATENT DOCUMENTS

| 698,373 | 1964 | Canada | 151/7 |
| 870,861 | 1971 | Canada | 403/295 |
| 81,850 | 1963 | France | 403/292 |
| 1,073,147 | 6/1967 | United Kingdom | 403/372 |

Primary Examiner—Andrew V. Kundrat
Attorney, Agent, or Firm—Cushman, Darby & Cushman

[57] ABSTRACT

This specification discloses a tube connector system adapted to convenient and removable assembling of square, round or other shaped hollow tubes. It finds use in the construction of temporary and permanent store displays, furniture, shelves, and the like. In one embodiment the connector comprises a joining member having a plurality of insertion members each of which is closely but slidably fitted to the aperture in the end of a hollow tube. Each insertion member has a plurality of recesses on the side thereof. Each recess is provided with a resilient spring member, said spring member having a portion resting on the bottom surface of said recess, and a portion protruding above the top of said recess, permitting forceable entry of the insertion member and retaining it removably in place in the tube. No rotation of the parts is necessary for secure assembly, and no external parts such as screws, bolts, and the like are needed. A joining member involving a plurality of these insertion members can be used for assembling various types of structures, including two or three dimensional assemblies. In a preferred embodiment this spring member is formed from substantially flat spring metal such as spring steel, and is curved to provide a force fit between the insertion member and the inside wall of the tube.

25 Claims, 16 Drawing Figures

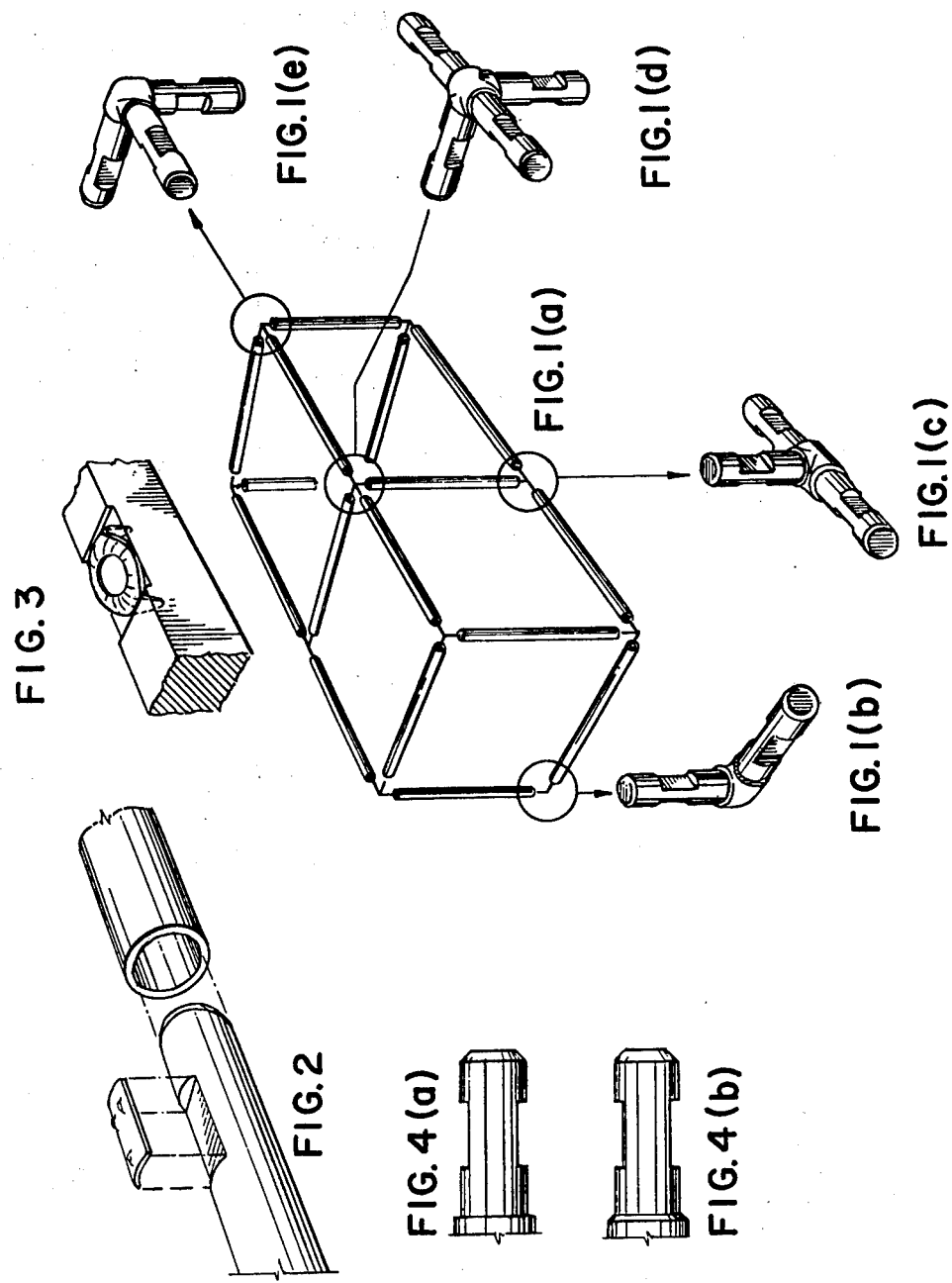

TUBE CONNECTOR

The present invention relates to a device for anchoring one end of a hollow tube, and more particularly to a tube connector for assembling two or more tubes into a frame work without the use of any tools or bolts. The connector is adapted to the convenient and removable assembling of square, round, or other shaped hollow tubes. It finds use in the construction of temporary and permanent store displays, furniture, shelves, and the like. No rotation of the parts is necessary for secure assembly, and no external parts such as screws or bolts are needed. This connector can be used for assembling various types of structures, including two or three dimensional assemblies.

There are many tube connection systems presently on the market and otherwise disclosed in the prior art, which employ bolts, pins, screws of other external devices to secure the connection between the tubes and the connecting device. Such connectors have been found inconvenient to use and do not provide the quick and easy assembly and disassembly as provided by the present invention. There are other types of connectors employing various flat spring clips, pins, grooves, and the like. Other devices known in the art require the rotation of the locking device in the tube, for the purpose of actuating some sort of lock.

Examples of the known prior art are as follows:
Canadian Pat. No. 945,335 (Fastening Devices), Apr. 16, 1974;
Canadian Pat. No. 891,216 (Tubular Frame Joint Member), Jan. 25, 1972;
Canadian Pat. No. 870,861 (Corner Construction and Method of Connecting Rectangular Frames Members Together), May 18, 1971; U.S. Pat. No. 3,883,257 (Molded Loint Component for Tubular Frame Furniture), May 13, 1975;
U.S. Pat. No. 3,272,582 (Building Components for Constructing Cabinets), Sept. 13, 1966, Anderson et al;
U.S. Pat. No. 3,176,428 (Take-Apart Toy Propeller), Apr. 6, 1965;
Canadian Pat. No. 814,243 (Garment Rack and Method of Assembling Same), June 3, 1969;
Canadian Pat. No. 759,198 (Connection Means for Tubular Frameworks), May 23, 1967;
Canadian Pat. No. 480,317 (Tubing Coupler), Jan. 15, 1952;
British Pat. No. 983,424 (Devices for Assembling Tubular Frameworks, and Frameworks Incorporated the Same), Feb. 17, 1965;
British Pat. No. 594,187 (Couplings for Tubes), Nov. 5, 1947;

It is an object of the present invention to provide a device which may be used to connect together a plurality of tubes, or a tube with another device, without welding or bolting. Another object of the present invention is to provide a tube connector which enables firm and strong connections to be made between tubes in display or furniture structure, without necessity for rotating the parts together. A further object of the present invention is to provide a tube connector system involving relatively low production and material costs.

Thus the present invention provides a connector system for joining tubes, said system comprising a plurality of hollow tubes each having outer walls and an aperture, and said system comprising a connector having a plurality of insertion members each of which is closely but slidably fitted to the aperture in the tube, each of said insertion members presenting at least one recess on the side thereof and defined by a bottom recess surface and two end surfaces, said recess being provided with a resilient compressible spring member, said spring member having a base portion resting on the bottom surface of said recess and an arched portion protruding beyond the top of said recess, whereby to permit forcible entry of the insertion member and to frictionally retain it removably in place in the tube.

In one embodiment the connector device will be provided with three insertion members at right angles to each other. This will enable the joining of three tubes to form the corner of a box-like structure. In a further embodiment there is provided a fourth insertion member colinear with one of the other three, thus enabling the building of three-dimensional multi-stage structures.

The spring member will preferably be formed from substantially flat spring metal such as spring steel. It is preferably a continuous sheet and is preferably curved or otherwise projected upwardly to provide a force fit between the insertion member and the inside wall of the tube. In a preferred embodiment an arched or domed portion of the sheet spring will protrude beyond the top of the recess. The spring member may be crimped in place by means of a conventional die applied to the edges of the recess.

Similarly it may be designed to have a force fit in the recess of its insertion member. Alternatively or additionally other means such as lugs may be used to retain the clip on the insertion member before assembly. The spring member may be made of other materials, and for example may be a plug of deformable plastic. In a preferred embodiment the spring member is provided with peripheral outward projections providing resilient points of contact with the tube wall.

In the case of square hollow tubes the insertion members will be square in cross section, and will be dimensioned such that they are fitted closely but slidably in the square aperture in the end of the tube. The use of the present invention makes possible the secure and rigid fastening together of such square tubes together, without the necessity for rotation about the coupling member.

In the case of round hollow tubing the insertion members will be round in cross section, and will be closely but slidably fitted to the round aperture at the end of the tube.

The recess will constitute a cut out portion on each insertion member provided on a connector device. In the case of a round insertion member the recess will preferably have a flat bottom forming a chord in the insertion member. The aperture will preferably be spaced from the proximal end of the insertion member, and in most cases will also be spaced from the distal end of the same insertion member. The insertion member will preferably be provided at its proximal end with a shoulder to abut the end of a tube, and to secure the connections between the tube and the insertion member on the joining member.

The shoulder may be sloped in order to provide and ensure a snug fit with the end of a tube, particularly under compressive stress. In other words whenever the tube is in a longitudinal pressure situation where it is being forced against the shoulder of the connector, the sloping shoulders will ensure that the tube is snugly and rigidly held in place, with a reduction in possible lateral movement or rattling. However this feature is not considered essential to the ordinary use of this device.

The connector device will normally be formed from a moldable or castable material. Where great strength is required a metal such as zinc alloy may be employed. In less rigorous applications of this device a plastic may be used such as nylon or ABS (acrylonitrile-butadiene-styrene.) The plastic may be filled with glass fibre for greater strength.

In another aspect the present invention provides a connector system for joining hollow tubes, said system comprising a plurality of hollow tubes each having outer walls and an aperture, and said system comprising a connector having a plurality of insertion members each of which is closely but slidably fitted to the aperture in the tube, each of said insertion members presenting at least one recess on the side thereof and defined by a bottom recess surface and two end surfaces, said recess being provided with a resilient compressible spring member, said spring member having a base portion resting on the bottom surface of said recess, and a portion protruding beyond the edges of said recess, whereby to permit forcible entry of the insertion member and to frictionally retain it removably in place in the tube.

The present invention finds particular value in dealing with the problem of building structure out of hollow steel tubes, such are frequently seen in department store displays and the like. The tubes are typically made of welded steel or extruded aluminum. Although the present specification discusses the joining of hollow tubes the same principles will of course apply to the joining of solid tubes which have a hollow aperture at least at one end, which will behave like a hollow tube. The hollow tubes may be made of plastic in certain applications where great strength is not required.

In a preferred embodiment, the connector has a plurality of insertion members each of which is closely but slidably fitted to the aperture in the tube, said insertion member presenting at least one recess on the side thereof, said recess being defined by a bottom surface and an inner or proximal end face transverse to the insertion member, said device further comprising a resilient spring member retained in said recess and having an outer end abutting said inner face, said spring member being a curved, domed, or arched spring means, such as a leaf spring or a dome shaped clip, having a portion resting on said recess bottom surface and a portion protruding radially beyond said recess and permitting forcible entry of the insertion member, and retaining it removably in place in the tube. In a most preferred embodiment, the recess is also defined by a distal end face, as well as the aforementioned proximal end face transverse to the member, and the leaf spring extends radially beyond the top of the recess, and also forms a force fit between the two transverse end faces of the recess.

In the drawings which form a part of the specification:

FIG. 1 shows semi-schematically a connector system assembly made from connectors and tubes in accordance with certain embodiments of this invention.

FIGS. 2 and 3 show details of embodiments which are adapted to the use of round and square tubes, respectively.

FIG. 4 show side elevations of insertion members.

Figure 5:
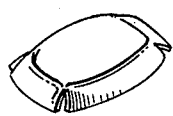
FIGS. 5 to 11 are further embodiments of metal clips for use in connectors of this type.

Referring to the drawings, it can be seen that FIG. 1 shows a stylized view of a structure assembled from tubes and connectors. FIGS. 1(b), (c), (d), and (e) show details of the cast parts of various embodiments of the connectors.

FIG. 2 show in perspective an insertion member having a recess spaced from the distal end thereof. The recess presents a flat bottom face cut into the round body of the insertion member, and there is a retaining clip in the recess. The retaining clip is dimensioned such that it makes a force fit between the proximal and distal end faces of the recess. It is also curved so as to protrude from the recess above the line of the insertion member. To provide additional frictional engagement with the tube, this embodiment is provided with outward projections or bumps, providing resilient points of contact with the tube wall. The clip in this embodiment was made from spring steel of sufficient thickness and rigidity to provide a very strong retaining force on the tube wall after installation.

FIG. 3 shows a further embodiment in which a square insertion member is adapted for insertion into a square tube. In this particular embodiment shown in FIG. 3, there is provided a spring clip forming a part of a sphere with a central aperture, providing strong pressure on the tube wall after inserted in a tube. This embodiment is also provided with downwardly depending clips which have been fitted to slots in the bottom of the recess in the insertion member. It could also be applied by making a force fit with the recess of the insertion member, as previously described.

FIG. 4(a) shows an elevation of an insertion member of the type shown schematically in FIG. 2. This elevation shows a shoulder provided at the proximal end of the insertion member, near the joining member, for abutment against the end of the tube upon assembly.

FIG. 4(b) shows a slight variation in which the shoulder is sloped or inclined (exaggerated in this drawing for clarity,) in order to assist in locking the tube against lateral movement, however slight.

FIG. 5 shows another embodiment of a metal clip of a type which could fit into an aperture on an insertion member as shown in FIG. 2 or FIG. 3. The corners of the clip of FIG. 5 are cut away for flexibility.

Figure 6:

FIG. 6 shows another embodiment of a metal clip which resembles the metal clip in FIG. 5 but which is closed at the corners thereof.

Figure 7:

FIG. 7 illustrates still another embodiment which has a laterally protruding flat portion or lip, providing additional strength, and an upwardly projecting dome, applying pressure on the tube. The embodiment of FIG. 7 is a preferred embodiment.

The lip may if desired protrude laterally beyond the recess for contact with and pressure on, the inner wall of a mating tube.

Figure 8:
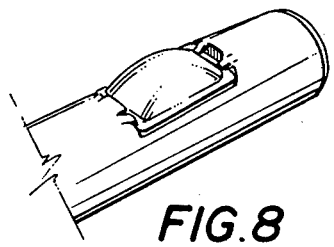

FIG. 8 shows an insertion member on which a clip in accordance with FIG. 7 is in place in a recess. The clip is firmly retained in place by a crimp applied to the adjacent ends of the recess.

Figure 9:
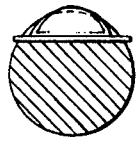

FIG. 9 shows an example similar to that of FIG. 8, but it will be noted that in this embodiment the longitudinal edges of the clip project laterally so as to press on the inside of a tube.

Figure 10:
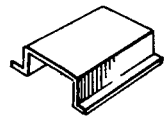
Figure 11:
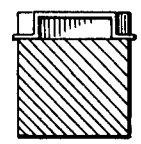

FIG. 10 shows a somewhat different spring member or clip. In this embodiment the spring clip is flat on top, not necessarily extending above the recess, but extending laterally so that its longitudinal edges are in contact with the inside of a round or square tube. FIG. 11 shows schematically in cross-section the positioning of such a clip in the recess of a square insertion member. As can be seen in FIG. 11 the clip protrudes laterally a short distance beyond the side edges of the recess.

The spring members of the various embodiments may be made of any suitable spring metal, such as, for example sheet spring metal of 8 to 20 thousanths of an inch, or preferably about 10 to 15 thousanths of an inch, (0.01 to 0.015 inches).

In connection with a ½ inch tube we have found that such a clip should protrude for example about 10 to 30 thousanths of an inch, although this may be varied depending on the closeness of the fit between the insertion member and the tube.

The domed embodiments for the most part, exhibit little elasticity, thus a good degree of matching is usually needed between the size of the insertion member and the inner diameter of the hole in the tube. For example, referring to an embodiment of the insertion member shown in FIG. 4, typical dimensions would be as follows. These measurements should not be considered restrictive but are merely typical of a preferred working embodiment of this invention. These measurements represent extremes on a group of such insertion members and associated spring member clips which were manufactured in a production run for testing purposes. The distance between the bottoms of adjacent recesses on an insertion member was in the range of 0.278 to 0.282 inches, with an average of 0.280. The diameter of the insertion member was in the range of 0.428 to 0.436, with an average of 0.433. The inside diameter of the tube was 0.4365 to 0.437. Thus the space between the average insertion member and the associated tube was in the neighbourhood of 0.003 to 0.004 inches (3 to 4 mils.) The spring members of the type shown in FIGS. 7 and 8 were made of spring steel approximately 15 mils. thick. They had an overall height of 93 to 97 mils., with an average of 95 mils. Thus when the diameter of all of the parts was towards the upper end of each range there might be required a "collapse" or compression of the spring member in an order of 18 mils. More typically, compression of about 10 mils., was involved. Given the nature of the spring steel and the type of end uses involved in this invention, this provided a very suitable assembly system, generally joinable and dismountable by means of a mallet, or in some cases even by hand. On the other hand, such assemblies exhibit very good strength and stability characteristics, with little or no looseness or vibration, particularly when assembled into a three dimensional structure, where any possible looseness would be counteracted by the fact that the various insertion members and their spring clip members are associated in different positions.

In the case where a particular connector connection member is found to be a little too loose in a particular tube, either through misuse or possibly through unsatisfactory quality control in the sizes of the parts, it may well be possible to take up such slack by placing an additional spring clip of the type shown in FIG. 7 or otherwise, into the recess opposite to the side of an insertion member in which a clip was previously crimped in place. The recess on the opposite side will normally be empty, unless a clip is needed in that opposite side for some specific purpose as mentioned above. It may also be desirable to put an additional spring clip in that empty recess in a case where an extra strong connection is required, or where there will be some considerable longitudinal separating pull on the end of the tube, which might tend to cause the connecting member to slip out of the tube. This might be caused in situations of considerable vibration or the like, but generally speaking this will be an unusual situation and normally the second recess on each insertion member will be left empty. Apart from other things, this extra recess saves some metal in the production of the insertion members, with an certain amount of saving in weight as well.

The domed embodiments of this insertion are superior to the prior art devices since they provide the possibility of making good, tight connections which are strong and permanent, but at the same time are removable and replaceable. They exhibit better re-usability than do the devices of the prior art, such as the U.S. Patent to Anderson, as the projecting portion is not prone to jam upon withdrawal of the insertion member. The prior art does not provide the present invention's capability for repeated assembly and disassembly without fatigue or bending of the protruding portion of the spring.

Changes in details may be made within the scope of the invention, but what I claim as new is set out in the following claims:

1. A connector system for joining tubes, said system comprising a plurality of hollow tubes each having outer walls and an aperture, and said system comprising a connector having a plurality of insertion members each of which is closely but slidably fitted to the aperture in the tube, each of said insertion members presenting at least one recess on the side thereof and defined by a bottom recess surface and two end surfaces, said recess being provided with a resilient compressible spring member formed of substantially continuous spring metal, said spring member having a base portion resting on the bottom surface of said recess and an arched portion protruding beyond the top of said recess, whereby to permit forcible entry of the insertion member and to frictionally retain it removably in place in the tube, said arched portion being provided with upwardly punched projections providing resilient points of contact with the tube wall.

2. A connector system for joining tubes, said system comprising a plurality of hollow tubes each having outer walls and an aperture, and said system comprising a connector having a plurality of insertion members each of which is closely but slidably fitted to the aperture in the tube, each of said insertion members presenting at least one recess on the side thereof and defined by a bottom recess surface and two end surfaces, said recess being provided with a resilient compressible rectangular spring member formed of substantially continuous spring metal, said spring member having a downwardly extending periphery forming a base portion resting on the bottom surface of said recess, said base portion being provided with a slit at each of the four corners thereof, said spring member also having an arched portion protruding beyond the the top of said recess, whereby to permit forcible entry of the insertion member and to frictionally retain it removably in place in the tube.

3. A connector system for joining tubes, said system comprising a plurality of hollow tubes each having outer walls and an aperture, and said system comprising a connector having a plurality of insertion members each of which is closely but slidably fitted to the aperture in the tube, each of said insertion members being provided at its proximal end with a sloped shoulder to provide a snug fit with the respective tube and each of said insertion members presenting at least one recess on the side thereof and defined by a bottom recess surface and two end surfaces, said recess being provided with a resilient compressible spring member, said spring member having a base portion resting on the bottom surface of said recess and an arched portion protruding beyond the top of said recess, whereby to permit forcible entry of the insertion member and to frictionally retain it removably in place in the tube.

4. A connector system for joining tubes, said system comprising a plurality of hollow tubes each having outer walls and an aperture, and said system comprising a connector having a plurality of insertion members each of which is closely but slidably fitted to the aperture in the tube, each of said insertion members presenting at least one recess on the side thereof and defined by a bottom recess surface and two end surfaces, said recess being provided with a resilient compressible spring member formed of substantially continuous spring metal, said spring member having a base portion resting on the bottom surface of said recess and an arched portion of spherical section protruding beyond the top of said recess and provided with a central aperture, whereby to permit forcible entry of the insertion member and to frictionally retain it removably in place in the tube.

5. A connector system for joining tubes, said system comprising a plurality of hollow cylindrical tubes each having outer walls and an aperture, and said system comprising a connector having a plurality of cylindrical insertion members each of which is closely but slidably fitted to the aperture in the tube, each of said insertion members presenting at least one recess on the side thereof and defined by a bottom recess surface and two end surfaces, said recess being provided with a resilient compressible rectangular spring member having a slit at each of the four corners thereof, said spring member being of sheet spring metal and having a downwardly extending periphery forming a base portion resting on the bottom surface of said recess and an arched portion protruding beyond the top of said recess, whereby to permit forcible entry of the insertion member and to frictionally retain it removably in place in the tube.

6. A connector system for joining tubes, said system comprising a plurality of hollow cylindrical tubes each having outer walls and an aperture, and said system comprising a connector having a plurality of cylindrical insertion members each of which is closely but slidably fitted to the aperture in the tube, each of said insertion members having a proximal end having a sloped shoulder to provide a snug fit with the end of a tube, each of said insertion members presenting at least one recess on the side thereof and defined by a bottom recess surface and two end surfaces, said recess being provided with a resilient compressible spring member, said spring member being of sheet spring metal and having a base portion resting on the bottom surface of said recess and an arched portion protruding beyond the top of said recess, whereby to permit forcible entry of the insertion member and to frictionally retain it removably in place in the tube.

7. A connector system for joining tubes, said system comprising a plurality of hollow cylindrical tubes each having outer walls and an aperture, and said system comprising a connector having a plurality of cylindrical insertion members each of which is closely but slidably fitted to the aperture in the tube, each of said insertion members presenting at least one recess on the side thereof and defined by a bottom recess surface and two end surfaces, said recess being provided with a resilient compressible spring member formed into a spherical section with a central aperture, said spring member being of sheet spring metal and having a base portion resting on the bottom surface of said recess and an arched portion protruding beyond the top of said recess, whereby to permit forcible entry of the insertion member and to frictionally retain it removably in place in the tube.

8. A connector system for joining tubes, said system comprising a plurality of hollow cylindrical tubes each having outer walls and an aperture, and said system comprising a connector having a plurality of cylindrical insertion members each of which is closely but slidably fitted to the aperture in the tube, each of said insertion members presenting at least one recess on the side thereof and defined by a bottom recess surface and two end surfaces, said recess being provided with a resilient compressible spring member, said spring member having downwardly extending clips adapted to fit into slots in the bottom surface of the recess, said spring member being of sheet spring metal and having a base portion resting on the bottom surface of said recess and an arched portion protruding beyond the top of said recess, whereby to permit forcible entry of the insertion member and to frictionally retain it removably in place in the tube.

9. A connector for releasably joining a plurality of hollow tubes each having an open end, said connector comprising insertion members each adapted to closely but slidably fit into one end of a tube, said insertion member having at least one recess in the side thereof, said recess having a flat bottom surface and two end surfaces spaced apart in an axial direction with respect to the axis of said insertion member and having open sides and an open top, a resilient compressible spring member disposed in said recess between said end surfaces, said spring member having a maximum length dimension essentially equal to the distance between said end surfaces of said recess and having a width dimension substantially equal to the distance between said open sides of said recess and a dome arched both axially and transversely substantially along its entire length with respect to the axis of the insertion member, said dome having an upper portion protruding beyond the top of the recess and having a lower peripheral portion defining a base resting on the bottom surface of the recess, whereby forcible entry of the insertion member and spring member into a tube of appropriate size frictionally engages the arched surfaces of the upper portion of the dome with the tube and frictionally retains the insertion member removably in place in the tube.

10. A connector as in claim 9 having three insertion members at right angles to each other.

11. A connector as in claim 9 wherein the insertion member is cylindrical and wherein the flat bottom of the recess lies on a chord of the insertion member.

12. A connector as in claim 9 wherein the dome of the spring member is provided with upwardly punched projections for providing resilient points of contact with the tube.

13. A connector as in claim 9 wherein the spring member is rectangular in plan view.

14. A connector as in claim 9 wherein the base of the spring member includes a lip at least a portion of which projects outwardly beyond the open sides of the recess in the insertion member so as to press against the inside of a tube when the insertion member and spring member are inserted into a tube.

15. A connector as in claim 9 wherein the insertion member is provided at its proximal end with a shoulder to secure the connectin between the tube and the insertion member.

16. A connector as in claim 15 wherein the shoulder has a height which corresponds to the outer diameter of the tube.

17. A connector as in claim 9 made of a zinc alloy.

18. A connector as in claim 9 made of nylon.

19. A connector as in claim 9 made of an ABS polymer reinforced with fiber glass.

20. A connector for joining hollow tubes each having an open end, said connector comprising a plurality of insertion members each adapted to closely but slidably fit into one end of a tube, said insertion member having at least one recess in the side thereof, said recess having a flat bottom surface and two end surfaces spaced apart in an axial direction with respect to the axis of the insertion member and having open sides and an open top, a resilient compressible spring member in said recess between said end surface, said spring member having a length dimension essentially equal to the distance between said end surfaces of said recess and having a maximum width dimension such that at least a portion of the spring member projects outwardly beyond at least one open side of the recess in the insertion member so as to press against the inside of a tube when the insertion member and the spring member are inserted into a tube.

21. A connector as in claim 20 wherein said outwardly projecting portion of said spring member extends the maximum length of the spring member.

22. A connector as in claim 20 wherein the spring member includes a dome arched axially and transversely with respect to the axis of the insertion member and projecting from the top of the recess, the dome having a base which engages the bottom of the recess and which forms said outwardly projecting portion of the spring member.

23. A connector as in claim 22 wherein the insertion member is cylindrical and wherein the bottom wall of the recess lies on a chord of the insertion member.

24. A connector as in claim 20 wherein the insertion member is rectangular in cross-section.

25. A connector as in claim 9 wherein said spring member is crimped in said recess by means of a die applied to adjacent portions of the insertion member.

* * * * *